(12) United States Patent
MacGregor et al.

(10) Patent No.: US 8,936,122 B2
(45) Date of Patent: Jan. 20, 2015

(54) WINDROWER TRACTOR WITH PARALLEL HEAT EXCHANGERS FOR COOLING OF ENGINE AND ASSOCIATED FLUIDS

(75) Inventors: Don MacGregor, Winnipeg (CA); Jann Peter Garbald, Winnipeg (CA)

(73) Assignee: MacDon Industries Ltd., Winnipeg, MB (CA)

( * ) Notice: Subject to any disclaimer, the term of this patent is extended or adjusted under 35 U.S.C. 154(b) by 122 days.

(21) Appl. No.: 13/537,370

(22) Filed: Jun. 29, 2012

(65) Prior Publication Data

US 2013/0319778 A1 Dec. 5, 2013

(51) Int. Cl.
*B60K 11/04* (2006.01)

(52) U.S. Cl.
USPC ..................................................... 180/68.1

(58) Field of Classification Search
CPC ......... B60K 11/08; B60K 11/04; F01P 11/10; F01P 11/12; F01P 5/06
USPC ........... 180/68.1, 68.4, 68.6, 69.2; 123/41.01, 123/41.65, 47.71; 165/41, 51, 122
See application file for complete search history.

(56) References Cited

U.S. PATENT DOCUMENTS

| | | | | |
|---|---|---|---|---|
| 2,050,451 A | * | 8/1936 | Nallinger | 180/68.1 |
| 2,346,178 A | * | 4/1944 | Mercier | 165/123 |
| 2,455,252 A | * | 11/1948 | Heth | 123/542 |
| 2,897,802 A | * | 8/1959 | Haas | 123/41.49 |
| 3,152,456 A | * | 10/1964 | Prendergast | 62/262 |
| 3,203,499 A | * | 8/1965 | Bentz et al. | 180/68.4 |
| 3,472,042 A | * | 10/1969 | Shriver et al. | 62/305 |
| 3,565,203 A | * | 2/1971 | Ashton et al. | 180/68.4 |
| 3,630,003 A | * | 12/1971 | Ashton et al. | 56/14.7 |
| 3,668,887 A | * | 6/1972 | Riello | 62/262 |
| 3,762,489 A | * | 10/1973 | Proksch et al. | 180/68.1 |
| 3,837,149 A | * | 9/1974 | West et al. | 55/282.5 |
| 4,020,900 A | * | 5/1977 | Kitagawa | 165/135 |
| 4,081,050 A | * | 3/1978 | Hennessey et al. | 180/233 |
| 4,160,487 A | * | 7/1979 | Kunze et al. | 180/68.4 |
| 4,186,817 A | * | 2/1980 | Bauer | 180/68.1 |
| 4,267,895 A | * | 5/1981 | Eggert, Jr. | 180/68.1 |
| 4,339,014 A | * | 7/1982 | Berth et al. | 180/68.1 |
| 4,341,277 A | * | 7/1982 | Adamson et al. | 180/68.1 |
| 4,443,236 A | * | 4/1984 | Peiler | 55/282.5 |
| 4,514,201 A | * | 4/1985 | Brown | 55/385.3 |
| 4,590,891 A | * | 5/1986 | Fujikawa et al. | 123/41.11 |
| 4,606,422 A | * | 8/1986 | Jewett | 180/68.1 |
| 4,690,204 A | * | 9/1987 | Reichel et al. | 165/44 |
| 4,738,327 A | * | 4/1988 | Takei | 180/68.1 |
| 4,757,858 A | * | 7/1988 | Miller et al. | 165/41 |
| 4,771,844 A | * | 9/1988 | Bassett | 180/68.1 |
| 4,821,796 A | * | 4/1989 | Schulz | 165/122 |
| 4,840,221 A | * | 6/1989 | Dumas et al. | 165/41 |

(Continued)

*Primary Examiner* — Brodie Follman
(74) *Attorney, Agent, or Firm* — Adrian D. Battison; Ade & Company Inc.

(57) ABSTRACT

An agricultural tractor having its engine longitudinally spaced along its frame from the operator cabin features at least two heat exchangers carried on the frame at a position located longitudinally between the operator cabin and the engine to perform air-cooling of at least one fluid associated with the engine. The two heat exchangers are arranged in parallel so as to each accept an intake stream of ambient air that is independent of a discharge stream of exhaust air from the other heat exchanger. Accordingly, each heat exchanger uses the coolest air possible to maximize the cooling potential of the system. The discharge stream of air from the heat exchangers is exhausted rearward to avoid recirculation of this heated air as the machine moves forward, and to direct the exhaust air past the engine for further cooling effect.

11 Claims, 8 Drawing Sheets

(56) References Cited

U.S. PATENT DOCUMENTS

| | | | |
|---|---|---|---|
| 4,886,135 A * | 12/1989 | Nakamura et al. | 180/68.1 |
| 4,979,584 A * | 12/1990 | Charles | 180/68.1 |
| 5,036,931 A * | 8/1991 | Iritani | 180/68.1 |
| 5,199,521 A * | 4/1993 | Samejima et al. | 180/68.1 |
| 5,284,115 A * | 2/1994 | Imanishi et al. | 123/41.7 |
| 5,495,909 A * | 3/1996 | Charles | 180/68.1 |
| 5,678,648 A * | 10/1997 | Imanishi et al. | 180/68.1 |
| 5,689,953 A * | 11/1997 | Yamashita et al. | 60/316 |
| 5,692,467 A * | 12/1997 | Sahm et al. | 123/198 E |
| 5,918,663 A * | 7/1999 | Hoglinger et al. | 165/41 |
| 5,947,195 A * | 9/1999 | Sasaki | 165/173 |
| 6,167,976 B1 | 1/2001 | O'Neill et al. | 180/69.2 |
| 6,321,830 B1 * | 11/2001 | Steinmann | 165/41 |
| 6,382,144 B1 * | 5/2002 | Schneider | 123/41.29 |
| 6,435,144 B1 * | 8/2002 | Dicke et al. | 123/41.12 |
| 6,435,264 B1 * | 8/2002 | Konno et al. | 165/41 |
| 6,443,253 B1 * | 9/2002 | Whitehead et al. | 180/68.1 |
| 6,454,294 B1 * | 9/2002 | Bittner et al. | 280/677 |
| 6,523,520 B1 * | 2/2003 | Chatterjea | 123/198 E |
| D483,454 S * | 12/2003 | Coy et al. | D23/323 |
| 6,655,486 B2 * | 12/2003 | Oshikawa et al. | 180/68.1 |
| 6,662,892 B2 * | 12/2003 | Falk et al. | 180/68.1 |
| 6,688,424 B1 * | 2/2004 | Nakada et al. | 181/224 |
| 6,871,697 B2 * | 3/2005 | Albright et al. | 165/51 |
| 7,121,368 B2 * | 10/2006 | MacKelvie | 180/68.1 |
| 7,143,852 B2 * | 12/2006 | Yatsuda et al. | 180/69.2 |
| 7,163,073 B2 * | 1/2007 | Schmid et al. | 180/68.3 |
| 7,255,156 B2 * | 8/2007 | Calton et al. | 165/115 |
| 7,320,299 B2 * | 1/2008 | Eavenson et al. | 123/41.49 |
| 7,325,518 B2 * | 2/2008 | Bering | 123/41.01 |
| 7,370,718 B2 * | 5/2008 | Witwer et al. | 180/69.2 |
| 7,383,905 B2 * | 6/2008 | Lang et al. | 180/68.1 |
| 7,431,073 B2 * | 10/2008 | Radke et al. | 165/119 |
| 7,458,434 B2 * | 12/2008 | Samejima et al. | 180/68.1 |
| 7,497,250 B2 * | 3/2009 | Coy et al. | 165/122 |
| 7,559,295 B2 * | 7/2009 | Yamada et al. | 123/41.31 |
| 7,571,785 B2 * | 8/2009 | Ferdows | 180/68.1 |
| 7,836,967 B2 * | 11/2010 | Daniel et al. | 172/781 |
| 7,849,952 B2 * | 12/2010 | MacGregor et al. | 180/306 |
| 7,892,671 B2 * | 2/2011 | Hamery et al. | 429/120 |
| 8,230,957 B2 * | 7/2012 | Braun et al. | 180/68.1 |
| 8,316,805 B2 * | 11/2012 | Kardos et al. | 123/41.04 |
| 8,347,994 B2 * | 1/2013 | Bering et al. | 180/68.3 |
| 8,453,777 B2 * | 6/2013 | Farlow | 180/68.1 |
| 8,505,661 B2 * | 8/2013 | Tsuji et al. | 180/68.4 |
| 8,590,650 B2 * | 11/2013 | Schertz et al. | 180/68.1 |
| 2002/0017408 A1 * | 2/2002 | Oshikawa et al. | 180/69.2 |
| 2002/0088655 A1 * | 7/2002 | Falk et al. | 180/68.3 |
| 2003/0066209 A1 * | 4/2003 | Takezaki et al. | 37/197 |
| 2003/0155107 A1 * | 8/2003 | Bianco | 165/124 |
| 2003/0168208 A1 * | 9/2003 | Sato | 165/122 |
| 2003/0183432 A1 * | 10/2003 | Suzuki | 180/68.1 |
| 2004/0262061 A1 * | 12/2004 | Bahr et al. | 180/69.2 |
| 2005/0013704 A1 * | 1/2005 | Dyson et al. | 417/364 |
| 2006/0016632 A1 * | 1/2006 | Samejima et al. | 180/68.1 |
| 2006/0185626 A1 * | 8/2006 | Allen et al. | 123/41.12 |
| 2006/0213708 A1 * | 9/2006 | Witwer et al. | 180/68.1 |
| 2007/0051326 A1 * | 3/2007 | Bering | 123/41.71 |
| 2007/0158053 A1 * | 7/2007 | Nicolai et al. | 165/122 |
| 2007/0193725 A1 * | 8/2007 | Coy et al. | 165/124 |
| 2008/0047245 A1 * | 2/2008 | MacGregor et al. | 56/10.8 |
| 2008/0108032 A1 * | 5/2008 | Tuhy et al. | 434/245 |
| 2012/0247729 A1 * | 10/2012 | Schertz et al. | 165/95 |
| 2012/0247738 A1 * | 10/2012 | Schertz et al. | 165/119 |
| 2013/0319778 A1 * | 12/2013 | MacGregor et al. | 180/68.1 |
| 2013/0319786 A1 * | 12/2013 | Kikuchi et al. | 180/306 |
| 2014/0014426 A1 * | 1/2014 | Lauper et al. | 180/68.1 |

* cited by examiner

WINDROWER TRACTOR WITH PARALLEL HEAT EXCHANGERS FOR COOLING OF ENGINE AND ASSOCIATED FLUIDS

FIELD OF THE INVENTION

The present invention relates generally to cooling systems for windrower or swather tractors, and more particularly to an improved cooling system employing heat exchangers positioned between the operator cab and engine in a configuration employing parallel ambient air inlets to minimize the intake air temperature of each heat exchanger for maximum heat transfer.

BACKGROUND OF THE INVENTION

Stringent emission standards have increased the heat rejection requirements of diesel engine cooling systems. As a result more efficient means of cooling these engines are required. Windrowers operate in high crop debris conditions that foul cooling systems. Increasing the cooling requirements requires more air flow through the coolers, which results in either higher velocity air given the same area, or larger cooler face with equal or reduced air velocities. Historically the cooling system in windrowers had the heat exchangers set up in series, i.e. with the discharging air stream from one heat exchanger forming the inlet air stream of a next heat exchanger, significantly reducing their overall efficiency. The most efficient heat exchanger has a large frontal surface area and a thin core exposed to ambient air.

John Deere, New Holland and the current production Mac-Don Windrower all use similar systems that draw the cooling system air in at the rear of the machine, through a series of heat exchangers, exhausting the hot air into the direction of travel in which the machine is driven while operating in the field (heavy loading so where cooling requirements are the highest. Such conventional arrangement is schematically illustrated in FIG. 1, where a windrower tractor 1 is being driven in a forward working direction F, in which the header 23A of the windrower 1 leads a frame 11 on which the operator cabin 30, engine 24, and heat exchangers 50a, 50b are carried. The engine 24 lies between the operator cab 30 and the heat exchangers 50a, 50b, which are mounted one behind the other at the rear of the tractor frame. The rearmost mounted heat exchanger 50a draws ambient air 52 in from behind the tractor for cooling one or more engine associated fluids (e.g. coolant, engine oil, engine charge air), and the air then continues forwardly through the second heat exchanger 50b to cool another one or more of the engine associated fluids. The intake air of the second heat exchanger 50b, being the same air discharged from the first heat exchanger 50a, is thus at a higher temperature than the ambient air used by the first heat exchanger.

This conventional configuration drawing in air for the cooling system at the rear of the machine and exhausting the hot air towards the front of the machine (i.e. in the direction of travel) acts to preheat the air being drawn into the system. That is, the forward discharge of the exhaust 54 air from the heat exchangers 50a, 50b creates an issue in that the forward working direction F of the machine moves the tractor forwardly past freshly exhausted air 54, which means that some of this exhaust air 54 is re-circulated through the heat exchangers, as shown in broken lines at 56, thus reducing the inlet air temperature and accordingly reducing the efficiency of the heat exchanger operation.

One known Hesston windrower, shown schematically in FIG. 2, differs from the above configuration, instead having the heat exchangers 18a, 18b positioned between the cab 14 and the engine to draw the ambient air 20 in behind the cab 14 on top of the engine hood 58, and then discharge the exhaust air 22 downwardly. However the majority of heat exchangers 18a, 18b or coolers in this configuration are still arranged in series.

A more recent Hesston design is shown schematically in FIGS. 9 and 10. This design employs parallel heat exchangers arranged in a box like configuration behind the engine, with two heat exchangers 50x-1 and 50x-2 facing rearward and two others 50y, 50z facing laterally outward. Ambient air 52 is drawn forwardly and laterally in at the rear of the machine by a fan 59 that is located opposite the rear heat exchangers 50x-1, 50x-2 and between the two lateral heat exchangers 50y, 50z, the air thus passing through heat exchangers 50x-1, 50x-2, 50y and 50z and then being discharged forwardly towards the engine before exiting laterally and downwardly from the engine compartment. While the use of parallel streams of intake air for the different heat exchangers presents some advantage over more conventional series configurations, the direction of exhaust air discharged from the heat exchangers again creates potential air recirculation paths 56 that may limit the heat exchange efficiency.

Accordingly, there is desire to provide an improved cooling system for the engine of a windrower or swather tractor.

SUMMARY OF THE INVENTION

According to a first aspect of the invention there is provided an agricultural tractor comprising:

a frame extending in a longitudinal direction the tractor;

a plurality of rotatable ground wheels connected to the frame to convey the frame over the ground, including drive wheels operable to drive the tractor in a forward working direction along the longitudinal direction of the tractor;

an operator cab carried on the frame;

an engine mounted in an engine compartment on the frame at a position longitudinally spaced from the cab in a rearward direction opposite the forward working direction; and at least two heat exchangers carried on the frame at a position located longitudinally between the operator cab and the engine and operable to perform air-cooling of at least one fluid associated with the engine, each of the two heat exchangers being arranged to accept an intake stream of ambient air that is independent of a discharge stream of exhaust air from the other of the two heat exchangers in the cooling of the least one fluid associated with the engine; and an exhaust air outlet configuration arranged to direct the discharge stream of air from each of the two heat exchangers in an exhaust direction having no forward component in the longitudinal direction.

Preferably the exhaust air outlet configuration is arranged to the direct the discharge stream of air from each of the two heat exchangers in the rearward direction.

Preferably the exhaust air outlet configuration is arranged to direct the discharge stream of air from each of the two heat exchangers past the engine.

Preferably the heat exchangers are arranged to have the intake stream of ambient air pass therethrough in a transverse direction crossing the longitudinal direction.

Preferably ambient air inlets through which the intake streams of ambient air enter the two heat exchanges are spaced apart from one another.

The ambient air inlets may be situated on opposite sides of a longitudinal center-line of the frame. Alternatively, the ambient air inlets may be in a central position on the longitudinal center-line of the frame positioned, for example overhead of the heat exchangers.

Openings of the ambient air inlets may face laterally outward to accept ambient air from respective sources on opposing sides of the tractor.

Alternatively, openings of the ambient air inlets face upward to accept ambient air from above the tractor. Another embodiment may employ combinations of laterally and upwardly opening ambient air inlets.

Preferably the two heat exchangers are arranged for air to flow through the heat exchangers into a central space therebetween.

There may be provided a housing enclosing the central space between the heat exchangers and a fan mounted to the housing to convey air through the heat exchangers into the housing, and then longitudinally rearward through the exhaust air outlet configuration.

Alternatively, there may be provided a respective fan for each of the two heat exchangers and air flow guides disposed in the space between the two heat exchangers, the fans being operable to convey air through the heat exchangers into the space therebetween, where the air flow guides then redirect the air longitudinally rearward. These fans may be driven independently or by a common shaft.

Preferably each fan is a variable speed fan.

There may be provided a fan controller operable to change an operating speed of the fan according to conditions monitored by said controller.

The one or more conditions monitored by said controller may include ambient air conditions.

Additionally or alternatively, the one or more conditions monitored by said controller may include engine load conditions, engine coolant, charge air or hydraulic oil cooler temperature.

Preferably each fan is a reversible fan operable in a heat exchange mode rotating in a first direction to convey ambient air inward through the heat exchangers from a surrounding environment, and a clean out mode rotating in an opposite direction to convey air outward through the heat exchangers into the surrounding environment to dislodge contaminants clogging intake areas of the heat exchangers.

Each fan may be hydraulically powered.

Instead of, or in addition to, one or more reversible fans, known types of self-cleaning screens may be incorporated into flow paths of the intake streams of ambient air to reduce restriction of the air flow caused by buildup of debris.

BRIEF DESCRIPTION OF THE DRAWINGS

In the accompanying drawings, which illustrate exemplary embodiments of the present invention.

DETAILED DESCRIPTION

Figure 4:
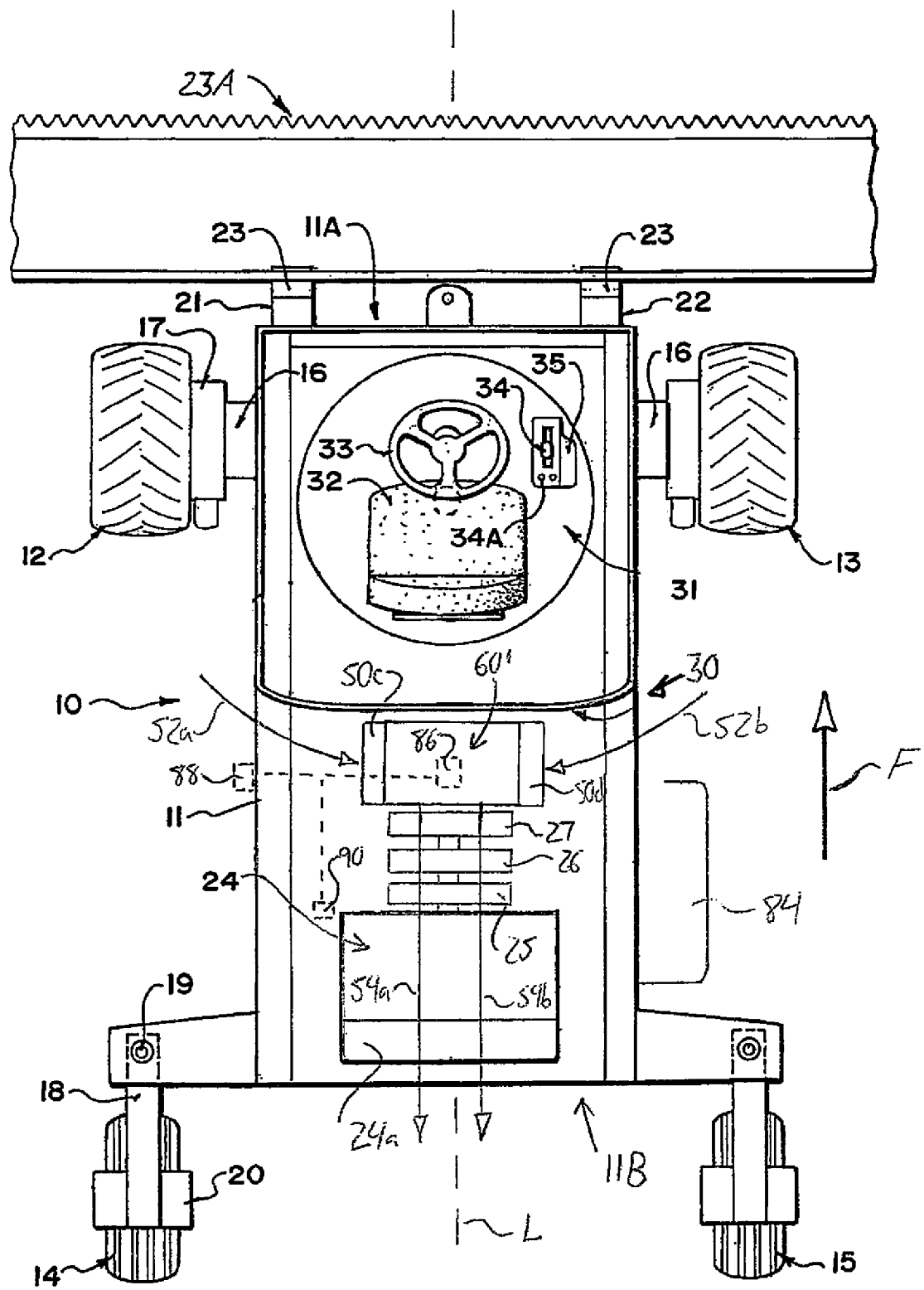
FIG. 4 is a more detailed schematic overhead view of a swather tractor, illustrating the airflow through a top-fed arrangement of parallel heat exchangers according to a second embodiment of the present invention.

With reference to FIG. 4, a swather tractor generally indicated at 10 includes a frame 11 which is carried on a first pair of driven ground wheels 12 and 13 and on a second pair of non-driven castor wheels 14 and 15. The driven wheels 12 and 13 are mounted on suitable supports 16 which support the ground wheels from the frame 11. The driven ground wheels 12 and 13 are each driven by a hydraulic motor 17 carried on the support 16 which receives hydraulic fluid under pressure from a supply line and drives the ground wheel at a rate of rotation dependant upon the rate of flow of the hydraulic fluid.

The wheels 14 and 15 are mounted on conventional castors 18 which swivel about a castor pin 19. The ground wheels 14 and 15 are non driven and are simply mounted in a supporting bracket 20 which can pivot around the castor pin 19 so that the castor wheels follow the movement of the vehicle as controlled by the driven wheels 12 and 13. Thus the speed of the vehicle over the ground is controlled by the rate of rotation of the wheels 12 and 13 and steering is controlled by a differential in speed between the wheels 12 and 13.

The frame is shown only schematically since this can vary widely in accordance with requirements, as is well known to a person skilled in this art. At the driven end 11A of the frame is mounted suitable supports 21 and 22 for carrying a header 23A. Again these elements are well known to persons skilled in this art and various different designs can be used. Thus the support elements 21, 22 on the header carried thereby are shown only schematically. Various different types of headers can be used including disc type cutters or sickle knife cutters. The width of the header can vary considerably depending upon the type of crop and the cutting system employed. The header is preferably carried on the tractor rather than on separate supports and the tractor includes a lifting mechanism schematically indicated at 23 operable to raise and lower the header on the tractor between different working positions, and between working positions and a raised position cleared from the ground for moving the header over the ground when not in working position.

The tractor includes an engine 24 carried on the frame 11 adjacent a second end 11B of the frame. The engine is arranged to drive a series of pumps 25, 26 and 27 for generating pressurized hydraulic fluid for driving the various components of the tractor. Separate pumps can be used as shown or single pump can be used with the hydraulic fluid under pressure generated thereby being separated into separate controlled fluid paths for operating the various components, or in a parallel arrangement such as on the M-series windrowers manufactured by the present assignee.

At the driven end 11A of the frame is provided a cab 30 which sits over the driven end between the driven wheels 12 and 13 so the operator can look over the header 23A during the operating action on the field. The cab 30 encloses an operator console generally indicated at 31 which includes a seat 32, a steering control 33 such as a conventional steering wheel, a speed control 34 and an accessory control 35. The steering wheel 33 is of a conventional nature and is mounted in the console in front of the seat by suitable mounting arrangements which allow the operator to enter the seat and be comfortably located on the seat behind the steering wheel. To the right hand of the operator is provided a speed control 34 generally in the form of a lever which can pivot forwardly and rearwardly between a reverse position at the rear, a neutral position at the center and a forward position at the front. In an intuitive manner, therefore, the operator can pull rearwardly on the lever for reverse and push forwardly on the lever for forward movement, with the rate of the movement being controlled by the relative position of the lever along its sliding action. In addition there is provided a switch 34A which can be operated to select speed ranges for the driving speed of the vehicle.

To the right hand of the operator, on the same lever as the speed control for convenient access to the operator's hand, is provided the accessory control 35 which includes a series of switches and levers for operating the position and operating parameters of the header attached to the tractor. The switches may include a header height and angle control by way of a four way (two axis) switch, a reel height and forward location control by way of a four way (two axis) switch and a reel speed control two way one axis switch so that the skilled operator can control the parameters of the header during the working action. The header is engaged by a main drive control lever in many cases also be reversed in the event of a blockage and thus will include a switch for allowing such reversal.

Many of the above components are well known and conventional and can be found in many different designs of such tractors manufactured by a number of manufacturers including the present assignee.

The operator console 31 may be of the type described in U.S. Pat. No. 7,159,687 of the present assignee, where the console is arranged to be rotatable about an upright axis between a first position (illustrated in FIG. 4) where the seat faces the driven end 11A of the machine and a second position (not shown) in which the seat faces the engine end 11B of the machine. The first of these positions is known herein as a "field" or "cab forward" mode where the operator console faces the header 23A for use of the same in the field with the machine driven in the illustrated working direction F. The other position may be known as a "transport" or "engine forward" mode, where the operator console faces the engine end 11B of the machine for road transport of the machine by driving of same in an opposite direction in which engine leads the cab. As the present invention is concerned primarily with the operation of the tractor's cooling system in the field mode, where both the header and drive system present loading on the engine as compared to transport mode where the header is not used, the terms front/forward and rear/back/rearward are used in relation to the forward working direction F shown in the drawings, where the header end 11A of the frame 11 and the cab 30 mounted at this end of the frame lead the engine in this direction, and thus define the forward end of the machine.

Figure 1:
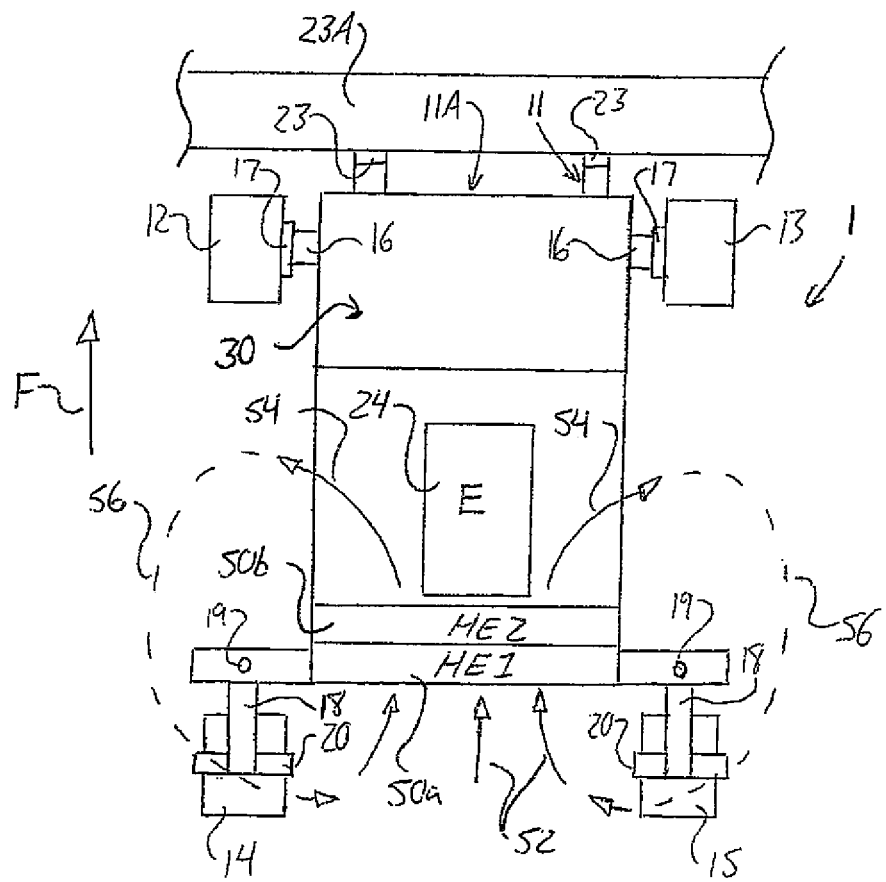
FIG. 1 is a schematic overhead view of one type of prior art swather tractor, illustrating the airflow through rear-mounted heat exchangers arranged in series behind the engine at the rear end of the tractor for cooling of one or more engine-related fluids.
Figure 2:
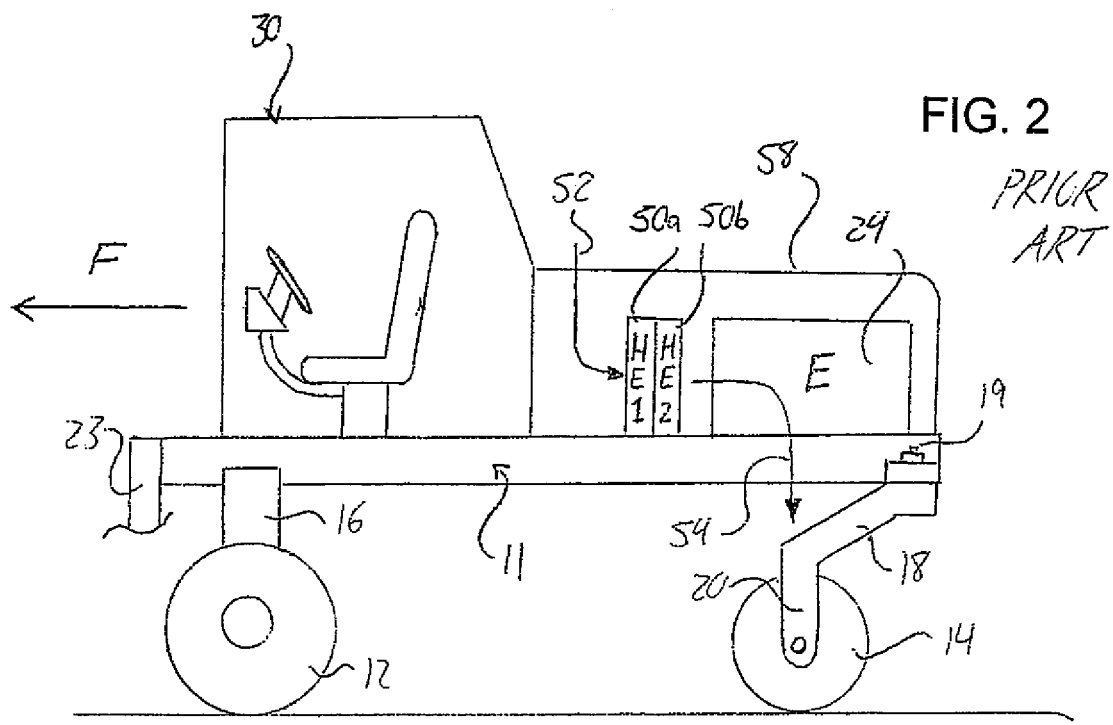
FIG. 2 is a schematic side elevational view of another type of prior art swather tractor, illustrating the airflow through intermediate-mounted heat exchangers arranged in series behind the operator cab, but ahead of the rear-mounted engine.
Figure 3:
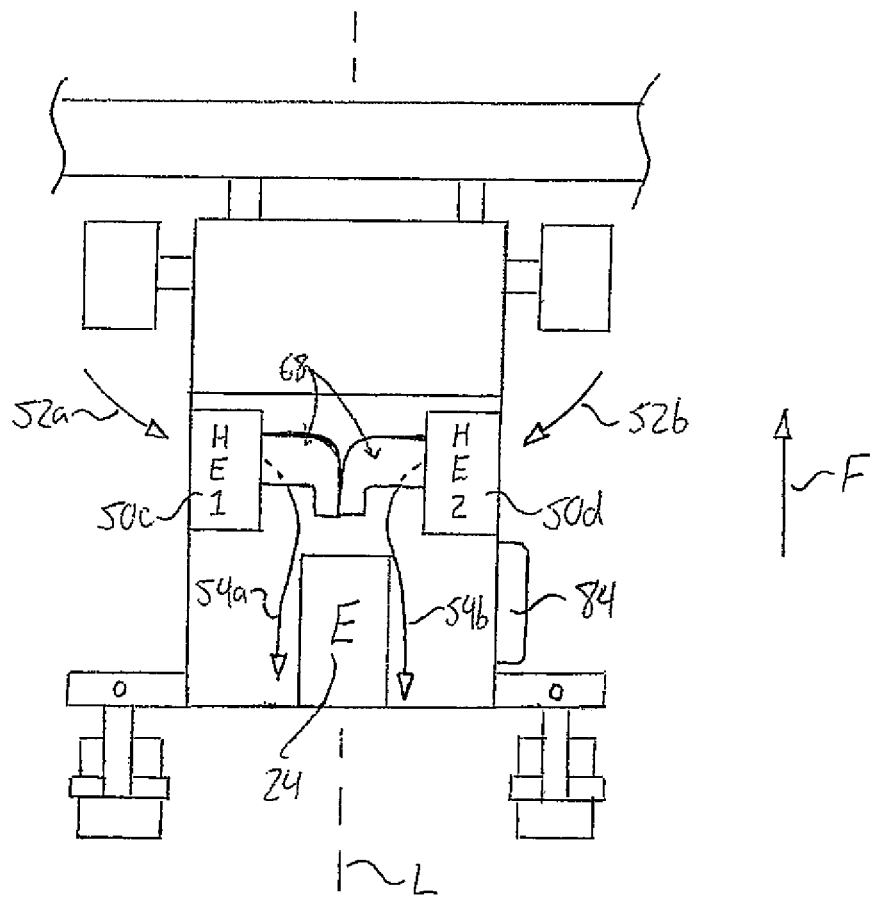
FIG. 3 is a schematic overhead view of a swather tractor, illustrating the airflow through a side-fed arrangement of parallel heat exchangers according to a first embodiment of the present invention.

With reference to FIGS. 3 and 4, where the swather tractor 10 of the present invention differs most notably from the prior art tractors of FIGS. 1 and 2 is in the positioning of its two heat exchangers 50c, 50d between the cab 30 and the engine 24 in a configuration acting to provide each heat exchanger 50c, 50d with a respective stream of ambient intake air 52a, 52b that is drawn in behind the cab 30 and is separate and independent of the exhaust air stream 54a, 54b of the other heat exchanger, which is directed rearward along the longitudinal axis L of the machine, past the engine 24 and out the rear end of the engine hood at the rear end of the frame. The use of the term independent to describe the relationship between the intake air stream flowing into each heat exchanger and the exhaust stream exiting the other heat exchanger is used to mean that the intake air of each heat exchanger is free of any exhaust air from the other exchanger. The 'term' independent does not necessarily dictate that the airflows moving through the heat exchangers remain separate (free of one another) in their entire travel through the machine, as for example, the exhaust air from the two heat exchangers may mix together after having passed through the heat exchangers.

The two heat exchangers may be multi-fluid heat exchangers, each providing air cooling of two or more fluids. The two heat exchangers may provide a total of four heat exchange relationships, for example in the form of an oil cooler, an AC condenser cooler, an engine radiator and an a charge-air cooler, with an optional fuel cooler providing a fifth heat exchange relationship.

In the illustrated embodiments, the two cross-flow heat exchangers 50c, 50d are spaced apart on opposite respective sides of a longitudinal center line L of the frame 11, with the cross-sectional area of each heat exchanger 52c, 52d (i.e. the plane of the heat exchanger that is perpendicular to the general direction of airflow through it) arranged to lie more parallel than perpendicular to the longitudinal direction of the frame 11, with the cross-sectional area facing laterally way from the center line L of the frame. One or more fans are operable to draw air inwardly through the heat exchangers into the central space left there between, where the air is redirected to travel rearward along the center line L of the frame, past the engine 24, and the hydraulic pumps 25, 26, 27 and any other engine-driven accessories 24a (alternative, air conditioning compressor, etc.) for exit through the rear end of the hood that encloses the engine compartment.

Figure 5:
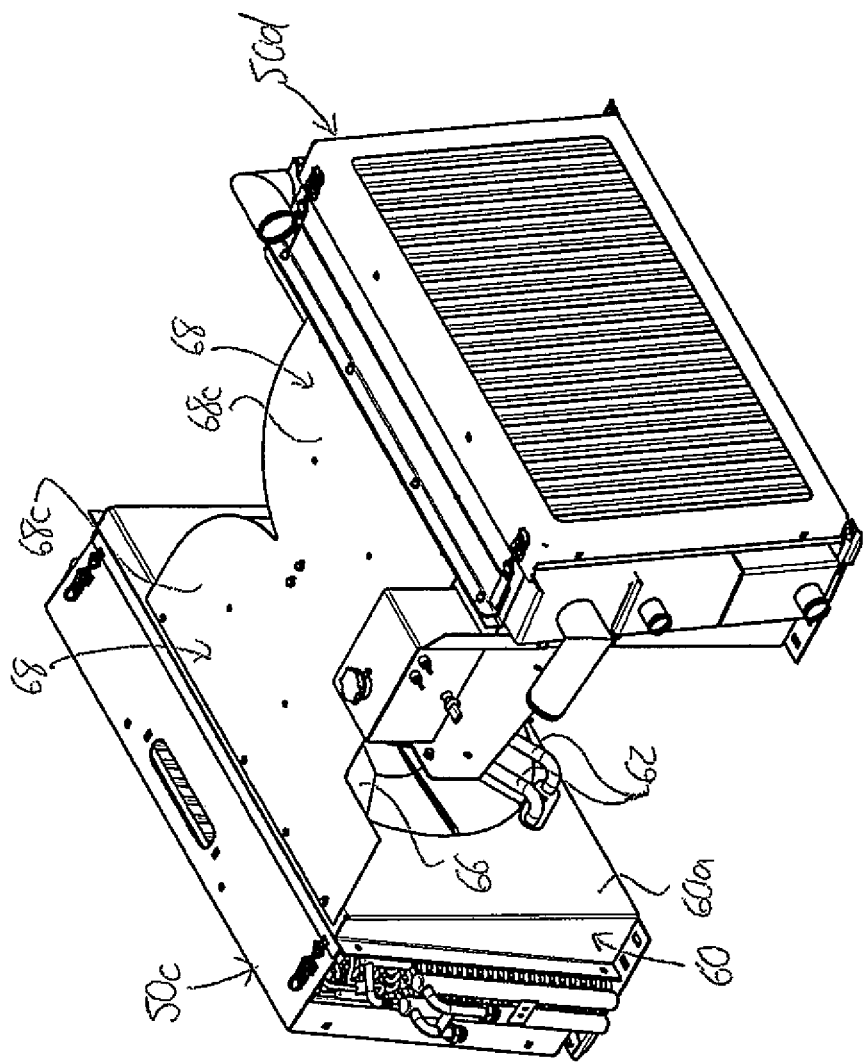
FIG. 5 is a perspective rear view of another side-fed heat exchanger assembly similar to that of FIG. 3.

In the heat exchanger assembly of FIGS. 3 and 5, each heat exchanger 50c, 50d is mounted to an outer face of a respective fan housing 60 located on a respective side of the center line L of the frame 11. An opposing inner face 60a of the fan housing 60 faces toward the center line L of the tractor frame 11 and features a pair of motor-mounting rails 62 spanning across a circular opening through the fan housing 60 in order carry a hydraulic motor 64 of the fan 66 that is rotatably supported in the circular opening of the housing 60 for driven rotation by the output shaft of the hydraulic motor 64. Airflow guides or deflectors 68 are positioned between, and may join together, the fan housings 60 of the heat exchangers. Each airflow guide features an upright front wall 68a projecting inwardly from the respective fan housing in front of the fan opening, and curving through ninety degrees about an upright axis. A central upright divider 68b then runs linearly rearward along the center line L of the tractor frame 11 past the fan openings from the curved front walls 68a of the airflow guides 68, and may be defined by a single central wall shared by the two airflow guides, or by face-to-face walls of the two airflow guides. In the illustrated embodiment, each airglow guide 68 is completed by a top wall 68c jutting outward from the fan housing over the fan opening therein to the central divider. The top walls may have separate walls or may be integrally defined by a common top wall spanning fully between the two fan housings.

Under rotation of each fan 66 in a predetermined direction by its respective hydraulic motor 64, for example under rotation of the two fans in the same direction with fan blades of opposite pitch, the fans draw air through the respective heat exchangers into the space therebetween, where the airflow guides then redirect the exhaust airflow from the heat exchangers rearwardly through the engine hood 58' of the tractor. Each hydraulic fan is reversible, whereby operation of the fans in the opposite direction will blow air backward through the heat exchangers from the space therebetween in order to loosen particulate or debris that has become lodged within the heat exchanger. Operation of the fans in the first direction thus defines a heat exchange mode of fan operation in which ambient air from outside the engine hood is drawn laterally thereinto through each heat exchanger, thereby cooling the one or more engine associated fluids circulating through conduits of the cross-flow heat exchanger. Operation of the fans in the second direction defines a cleanout mode, forcing air in the reverse direction from inside the engine hood out into the exterior environment.

Each heat exchanger may be operable to perform cooling of one or more fluids associated with the engine 24. For example as shown in FIGS. 3 and 5 the first heat exchanger 50c, situated adjacent the left side of the tractor when installed, may be a combined oil cooler and air conditioning condenser cooler. The second heat exchanger 50d at the right of the figure may feature an engine radiator having engine coolant inlet and outlet ports and a pressure cap, and also feature a charge-air cooler for cooling the compressed air from a turbocharger on its way to the engine for use in the combustion process. This is only an example of one possible configuration, and it will be appreciated that the number and type of fluids cooled by each heat exchanger, and the distribution of these fluids among the two heat exchangers may be varied, while still benefiting from the present invention's use of parallel airflows through the two heat exchangers to gain the advantage of low temperature ambient air at each one. In addition to the parallel heat exchangers, a small additional heat exchanger (e.g. fuel cooler) could be added in series if space limits or other constraints warrant or demand such a configuration without significant adverse effects of the achieved advantage of the lower-temperature inlet air for the parallel heat exchangers compared to the prior art series designs.

Figure 6:
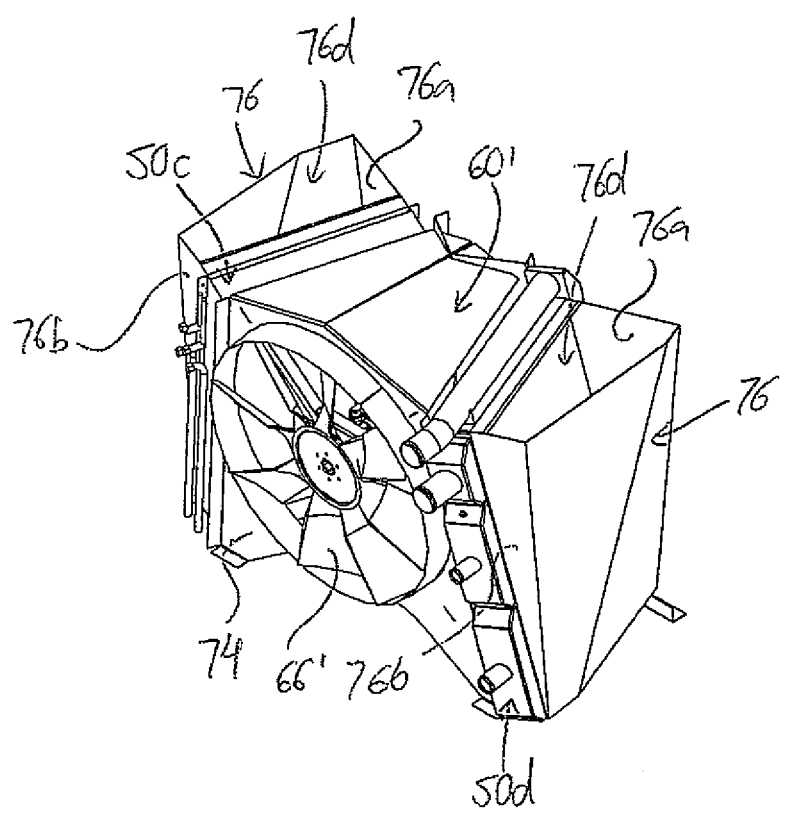
FIG. 6 is a perspective rear view of the top-fed heat exchanger assembly of FIG. 4.

FIG. 6 shows a second embodiment configuration of parallel heat exchangers. Again, each of the two heat exchangers 50c, 50d is disposed on a respective side of a central space left therebetween so as to reside on a respective side of the tractor's longitudinal center line L, but rather than being respectively mounted on two separate fan housings, the heat exchangers are mounted on the laterally outer side walls of a larger single fan housing 60' that encloses the space between the two heat exchangers. Instead of two fans having rotational axes lying transverse to the longitudinal center line of the tractor, a single fan 66' is supported in a sole opening of the fan housing 60' in the rear wall 74 thereof for driven rotation about a generally horizontal axis parallel to the longitudinal direction of the tractor frame 11. Again, the fan may be hydraulically powered and reversible for operation in both heat exchange mode and cleanout mode. In heat exchange mode, the fan draws air through the heat exchangers into the space therebetween, then blows the air rearwardly out of the fan housing to pass by the engine, and possibly engine-driven pumps and accessories depending on the engine compartment layout, for exit from the engine compartment through suitable openings in the rear wall of the engine hood. In one embodiment, the heat exchanger assembly shown in FIG. 6 may be mounted atop the hydraulic pumps, in which case the existing air flow will not directly flow over the pumps. For example, a six-cylinder engine model may have such a configuration where the pumps lie below the heat exchanger assembly, while a four cylinder model may have the pump situated behind the heat exchanger assembly, where they may be exposed to flow of discharge air from the heat exchangers. Some of the air discharged rearwardly from the heat exchangers air may move downward and exit the machine below the engine compartment.

The FIG. 6 embodiment also differs from that of FIG. 5 in the addition of inlet ducts 76 defined at the outer faces of the heat exchangers. Each inlet duct has front and rear walls 76a, 76b projecting laterally outward from the heat exchanger, and an outer wall 76c interconnecting the front and rear duct walls at distal ends thereof opposite the heat exchanger. The front and rear walls are tapered in width, each narrowing from its top end to a bottom point, whereby the outer wall 76c is obliquely sloped relative to the outer face of the heat exchanger. The duct is open at a top end thereof to create an inlet opening 76d bound by the tops end of the duct walls and the top end of the outer face of the heat exchanger. Due to the tapered front and rear walls and sloped outer wall, the duct is therefore also tapered to grow smaller moving from its open top end to its closed lower end at the bottom of the heat exchanger.

Still referring to the FIG. 6 embodiment, each heat exchanger is obliquely tilted about a horizontal axis out of a vertical orientation by approximately 20 degrees to lean its upper end inwardly toward the central longitudinal axis L of the machine, thus making room for the tapered inlet ducts that are wider at their upper inlet ends without increasing the width of the overall heat exchanger assembly. Each heat exchanger is also tilted obliquely about vertical axes to deviate from a from an orientation parallel to the longitudinal axis L of the machine so that the two heat exchangers lie in planes that horizontally diverge toward the rear end of the machine. This rearward divergence of the heat exchangers improves air flow inside of the housing 60' in that the two streams of exhaust air converge better, thereby reducing turbulence and as a result increasing overall efficiency. In addition, this configuration reduces the width of the overall heat exchanger assembly near the rear of the operator cabin, which allows for improved visibly of the caster wheels 14, 15 from the operator cabin, and also reduces the overall space taken up by the assembly.

The first embodiment of FIG. 5 lacks such inlet ducts, instead leaving the laterally outward facing sides of the heat exchangers exposed to communicate with the ambient environment outside the engine hood through suitably screened openings 78 in the sides of the engine hood 58' (FIG. 7) near the front end of the hood that resides behind the cab when the hood is in the closed position. In the second embodiment, the engine hood 58" (FIG. 8) features openings 80 in the top wall thereof at respective positions adjacent the sides of the hood to fluidly communicate the outside environment with the inlet openings 76d of the inlet ducts, which underlie the openings of the hood when the heat exchanger assembly is installed and the hood is closed. In the illustrated embodiment of FIG. 8, the inlet openings 80 in the hoods are not screened. Instead, a screen for each heat exchanger is found within the respective inlet duct 76 in an orientation lying parallel to the heat exchanger to maximize the screen area and thereby increase the length of time for debris to built up to level sufficient that will significantly restrict airflow.

Figure 7:
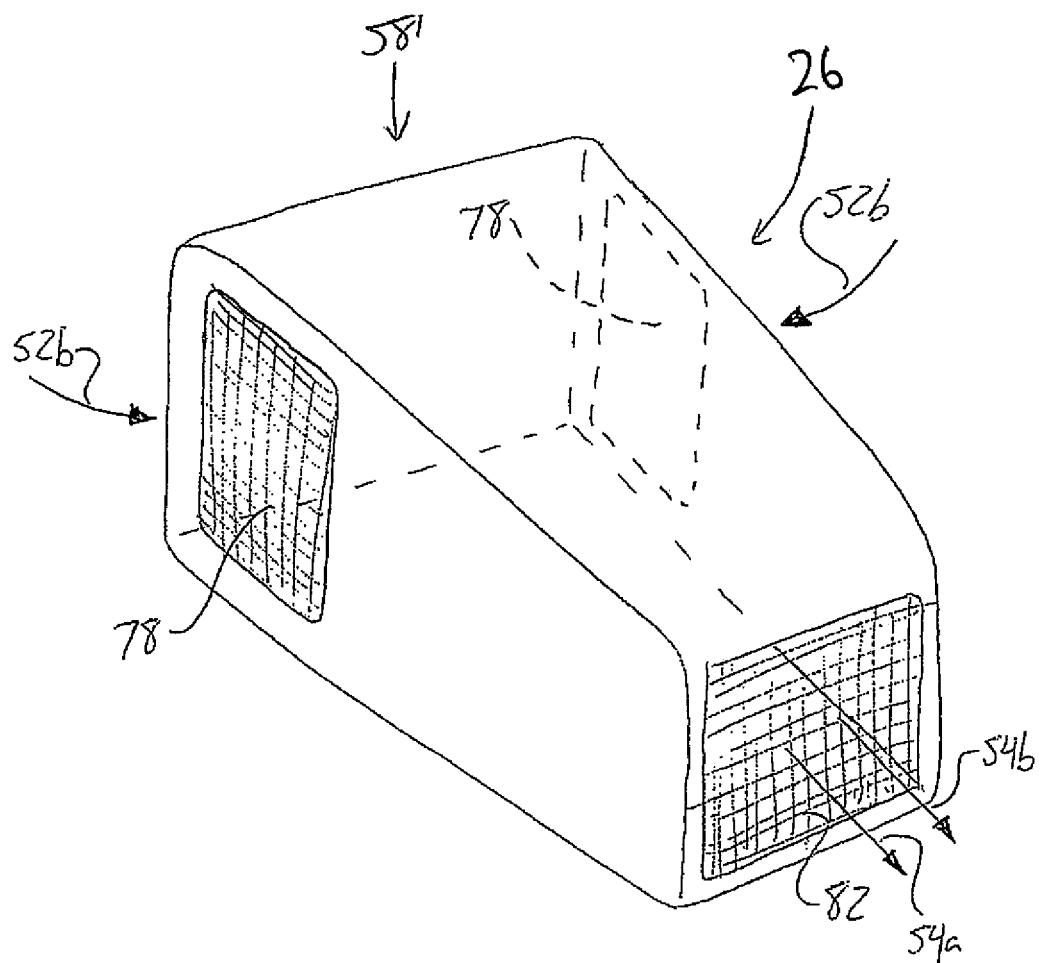
FIG. 7 is a schematic perspective view of an engine hood for the swather tractor of FIG. 3.
Figure 8:
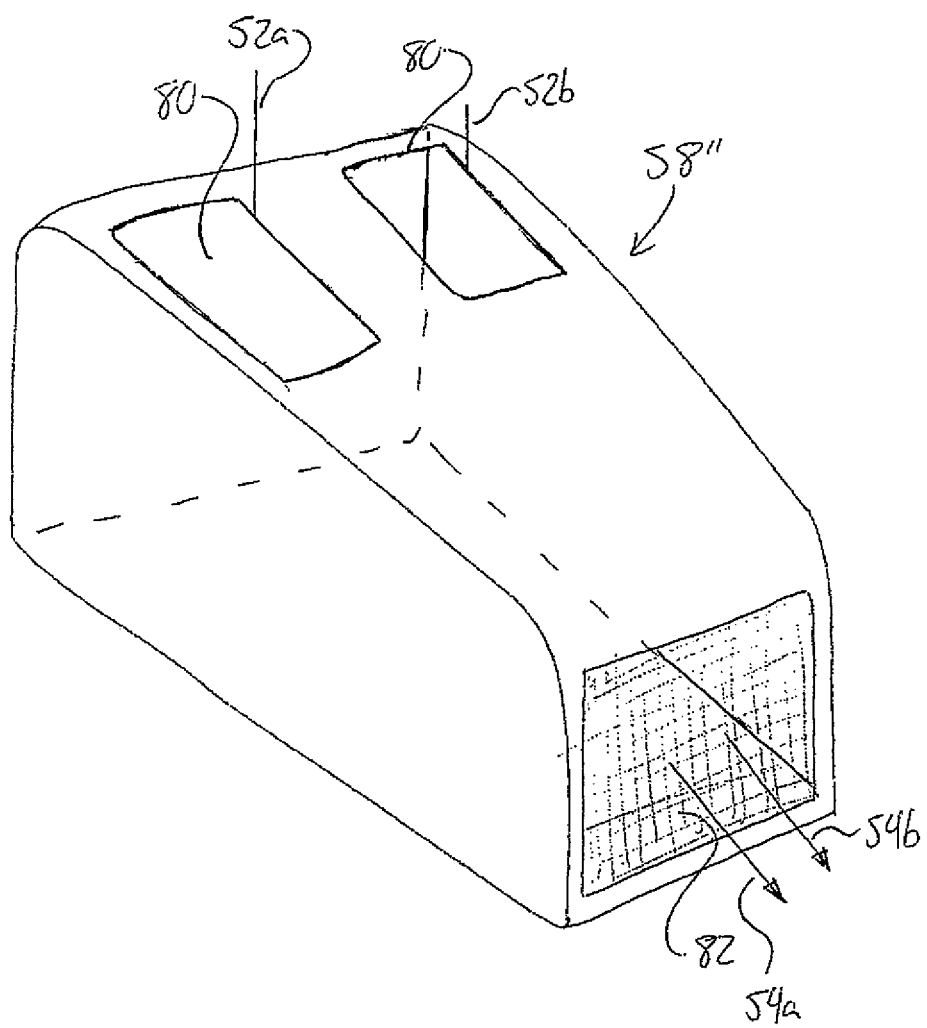
FIG. 8 is a schematic perspective view of an engine hood for the swather tractor of FIG. 4.
Figure 9:
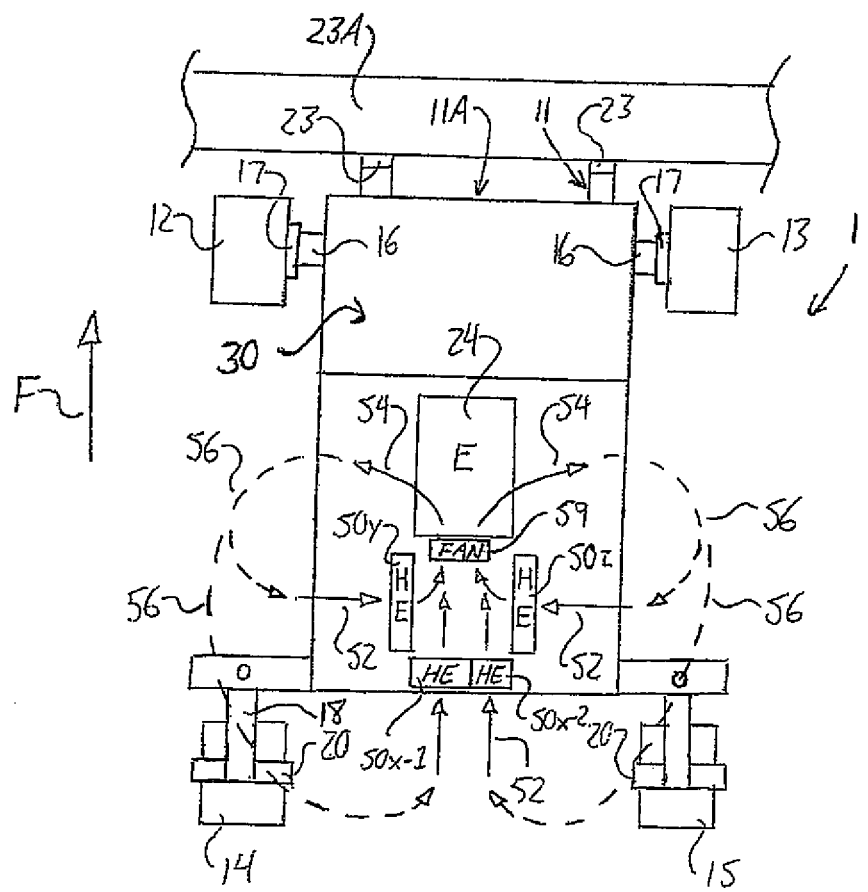
FIG. 9 is a schematic overhead view of yet another type of prior art swather tractor, illustrating the airflow through rear-mounted heat exchangers arranged in parallel behind the engine at the rear end of the tractor for cooling of one or more engine-related fluids.
Figure 10:
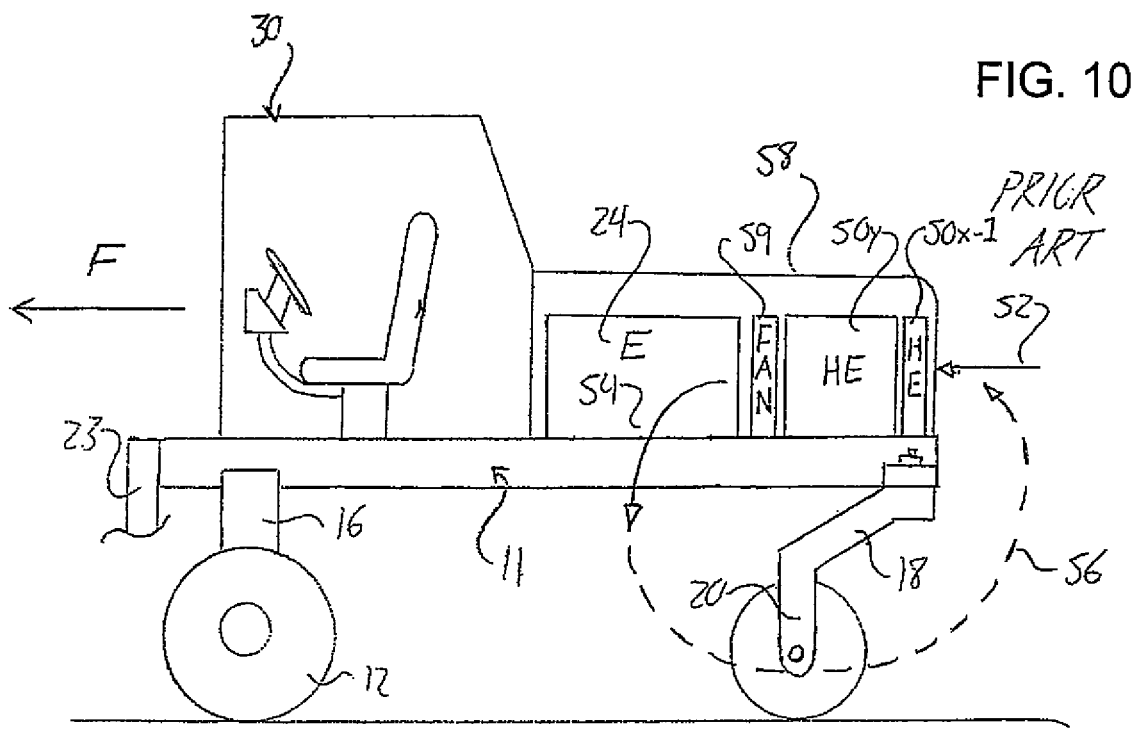
FIG. 10 is a side elevational view of the prior art swather tractor of FIG. 9.

In addition to these different positions of the air inlet openings in the hood, FIGS. 7 and 8 also schematically illustrated a screened or other arrangement of airflow openings 82 at the upright rear end of the hood so that the exhaust air being discharged rearwardly from the heat exchanger assembly inside the engine hood can exit the rear of the engine compartment after flowing past the engine and the engine driven pumps and accessories. As shown in FIGS. 3 and 4, the fuel tank 84 of the tractor is mounted externally of the engine hood at a lateral position at a respective side of the frame 11 so as not to form an obstruction to exhaust air flowing rearwardly through the engine compartment for exit through the rear end of the hood. This rear exhausting of the air from the heat exchangers allows this stream of exhaust air to collect additional heat from the engine and engine driven components inside the hood as it moves rearwardly therepast, thereby further improving the overall cooling functionality of the system.

With the engine oriented to place the bell housing of the engine and large hydraulic pumps 25, 26, 27 driven thereby at the front end of the engine, thus placing the smaller collection of other engine driven accessories 24a at the opposing rear end of the engine, the engine block can be placed as far rearward as possible on the frame, thereby maximizing a ballast effect of the engine in countering the weight of the header 23A carried at the front end of the frame. The positioning of the hydraulic pumps ahead of the engine also reduces the length of the hydraulic lines to the hydraulic wheel and header motors.

In addition to being reversible, the fan or fans of the heat exchanger assembly may have variable speed capability, for example employing fan controller (shown schematically at 86 in FIG. 4) to automatically adjust the fan speed using one or more sensor inputs to monitor one or more conditions, such as ambient air temperature measured outside the engine hood by exterior temperature sensor 88 or temperatures or other conditions reflective of engine loading inside the engine hood by interior sensor 90. Cooler ambient air temperatures mean a larger difference between the temperature of the cooling air and the engine fluid being cooled, and thus greater heat transfer therebetween, thereby allowing the fan speed to be reduced, which in turn reduces engine loading. High engine loading conditions increase the cooling requirement, and thus detected high-load conditions can be used to increase the fan speed to increase the volumetric flow rate of cooling air through the heat exchangers. Hydraulic fan controllers using electronic sensors to control valves in hydraulic fluid connections are known, and may be employed for automatic fan control in the present invention. Alternatively, other embodiments may employ electric fans in place of powered fans. Further alternate embodiments may employ screen cleaning systems of other types in addition to or in place of the reversible-fan based clean out system.

The described embodiments maximize the area available for all heat exchangers. With all heat exchangers exposed to ambient air, the system is more efficient, reducing the total volume required for heat exchangers. This large area is kept clean by the use of a pre-cleaning screen system and/or reversible fan system, which also allows for the option of reduced fan speed under light load conditions and/or low ambient temperature conditions to conserve power. The heat exchangers are located directly behind the cab, at which location the fresh air is drawn in. All of the heat exchangers are arranged in parallel, maximizing their heat transfer potential. The hot air is exhaust out the back of the machine, in the opposite direction of travel while operating the machine under load in the field.

Large surface area maximizes heat exchanger efficiency, minimizing the size of the heat exchanger. Large surface area allows reduction of core thickness, reducing the fan power required to move the volume of air required by the heat exchanger. With all coolers exposed to ambient air, the temperature differential between the cooling fluid and the fluid being cooled is greater, and as a result, efficiency is increased, allowing reduction of the cooler size. Large surface area reduces the cooling system's fresh air intake velocity, thereby reducing debris accumulation. Variable speed fans can be used to only supply the amount of air that is required to cool the system, reducing total fan power consumption. Air is drawn in at the longitudinal center of the machine just behind the cab, where dust and debris created by drive wheels and crop harvesting machines is minimized, while the hot cooling system exhaust air exits at the rear of the machine while operating in the field to minimize or remove possible recirculation of the hot air through the cooling system.

The described positioning of the heat exchangers between the operator cabin and the engine, presents a further advantage if the context of the aforementioned rotatable-console machines where the operator console cab face opposite directions for field/cab-forward and transport/engine-forward modes of operation, as the physical side of the heat exchangers can be increased to provide greater surface for more effective cooling with less detriment to the operators field of view past the engine-end of the machine, thereby minimizing the impact of larger heat exchangers on engine-forward visibility compared to layouts where the heat exchangers lie on the side of the engine opposite the operator cabin.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A swather tractor comprising:
a frame extending in a longitudinal direction of the tractor;
support members carrying a header across a front end of the frame for cutting a standing crop to form a swath;
a plurality of rotatable ground wheels connected to the frame to convey the frame over the ground;
the ground wheels including drive wheels at the front end of the frame operable to drive the tractor in a forward working direction along the longitudinal direction of the tractor;
the drive wheels being arranged to control steering of the tractor by a differential in speed between the drive wheels;
the ground wheels including a pair of castor wheels at a rear end of the frame which are arranged to castor in response to the steering of the tractor;
an operator cab carried on the frame at the front end of the frame behind the header;
an engine mounted in an engine compartment on the frame at a position longitudinally spaced from the cab at the rear end of the frame; and
two heat exchangers carried on the frame at a position located longitudinally between the operator cab and the engine;
each of the two heat exchangers having an air intake that is independent of a discharge stream of exhaust air from the other of the two heat exchangers; and
at least one fan arranged to draw air through the heat exchangers:
and an exhaust air outlet guide system arranged to direct the discharge stream of air from each of the two heat exchangers in an exhaust direction rearwardly toward and past the engine to the rear of the tractor.

2. The tractor of claim 1 wherein the air intakes of the two heat exchangers are arranged to face in a transverse direction.

3. The tractor of claim 1 wherein the air intakes of the two heat exchangers are spaced apart from one another.

4. The tractor of claim 3 wherein the air intakes of the two heat exchangers are situated on opposite sides of a longitudinal center-line of the frame.

5. The tractor of claim 3 wherein openings of the air intakes of the two heat exchangers face laterally outward to accept ambient air from respective sources on opposing sides of the tractor.

6. The tractor of claim 3 wherein the air intakes of the two heat exchangers face upward to accept ambient air from above the tractor.

7. The tractor of claim 1 wherein the exhaust air outlet guide system is arranged in a central space between the heat two exchangers.

8. The tractor of claim 7 wherein the exhaust air outlet guide system comprises a housing enclosing the central space between the two heat exchangers and said at least one fan is mounted to the housing to convey air through the heat exchangers into the housing, and then longitudinally rearward.

9. The tractor of claim 1 comprising a respective fan for each of the two heat exchangers and air flow guides.

10. The tractor of claim 8 wherein said at least one fan is a variable speed fan.

11. The tractor of claim 1 wherein said at least one fan is a reversible fan operable in a heat exchange mode rotating in a first direction to convey ambient air inward through the two heat exchangers from a surrounding environment, and a clean out mode rotating in an opposite direction to convey air outward through the two heat exchangers into the surrounding environment to dislodge contaminants clogging intake areas of the two heat exchangers.

* * * * *